(12) United States Patent
Iwai et al.

(10) Patent No.: US 7,032,925 B2
(45) Date of Patent: Apr. 25, 2006

(54) RUPTURABLE PLATE FOR INFLATOR

(75) Inventors: Yasunori Iwai, Shijyonawate (JP);
Yuzo Goto, Himeji (JP); Masayuki Nakayasu, Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 255 days.

(21) Appl. No.: 10/317,115

(22) Filed: Dec. 12, 2002

(65) Prior Publication Data

US 2003/0155755 A1    Aug. 21, 2003

Related U.S. Application Data

(60) Provisional application No. 60/360,011, filed on Feb. 28, 2002.

(30) Foreign Application Priority Data

Dec. 14, 2001   (JP)   ............................. 2001-381051

(51) Int. Cl.
*B60R 21/26*   (2006.01)

(52) U.S. Cl. .................. 280/737; 280/740; 280/741; 137/68.25; 137/68.26

(58) Field of Classification Search ........... 280/737, 280/740, 741; 137/68.13, 68.26, 68.25, 68.23

See application file for complete search history.

(56) References Cited

U.S. PATENT DOCUMENTS

| | | | |
|---|---|---|---|
| 3,567,245 A | | 3/1971 | Ekstrom |
| 3,680,886 A | | 8/1972 | Mazelsky |
| 4,146,047 A | * | 3/1979 | Wood et al. .............. 137/68.26 |
| 5,351,988 A | * | 10/1994 | Bishop et al. .............. 280/737 |
| 5,513,572 A | * | 5/1996 | Frantom et al. ............ 102/531 |
| 5,527,066 A | | 6/1996 | Svensson |
| 5,542,702 A | | 8/1996 | Green et al. |
| 5,632,505 A | * | 5/1997 | Saccone et al. ............. 280/737 |
| 5,664,804 A | * | 9/1997 | Saccone ..................... 280/737 |
| 5,782,486 A | | 7/1998 | Barnes et al. |
| 5,803,493 A | | 9/1998 | Paxton et al. |
| 6,131,948 A | * | 10/2000 | Cuevas ....................... 280/737 |
| 6,206,414 B1 | * | 3/2001 | Cook et al. ................. 280/734 |
| 6,217,065 B1 | * | 4/2001 | Al-Amin et al. ............ 280/737 |
| 6,227,562 B1 | * | 5/2001 | Shirk et al. .............. 280/730.2 |

(Continued)

FOREIGN PATENT DOCUMENTS

| | | |
|---|---|---|
| EP | 0687597 A1 | 12/1995 |
| EP | 1075988 A2 | 2/2001 |

(Continued)

*Primary Examiner*—David R. Dunn
*Assistant Examiner*—Toan C. To
(74) *Attorney, Agent, or Firm*—Birch, Stewart, Kolasch & Birch, LLP

(57) ABSTRACT

An inflator for an air bag, which inflates the air bag by a pressurized medium, has a rupturable plate that seals a pressurized portion of an inflator prior to an activation of the inflator. The rupturable plate is attached to the inflator by fixing a peripheral edge portion thereof to the inflator, and has at least one of the following parameters: (a) a ratio of diameter/thickness is 14 to 50, (b) a tensile strength is 880 to 1100 N/mm$^2$, and (c) elongation is 25% or more.

27 Claims, 2 Drawing Sheets

U.S. PATENT DOCUMENTS

| | | |
|---|---|---|
| 6,244,622 B1 * | 6/2001 | Al-Amin et al. ............. 280/737 |
| 6,273,462 B1 * | 8/2001 | Faigle et al. ................. 280/737 |
| 6,412,811 B1 * | 7/2002 | Campbell et al. ......... 280/730.2 |
| 6,446,653 B1 * | 9/2002 | Cullinane et al. ......... 137/68.25 |
| 6,607,214 B1 * | 8/2003 | Blakemore et al. ......... 280/741 |
| 6,629,703 B1 * | 10/2003 | Horton et al. .............. 280/737 |

FOREIGN PATENT DOCUMENTS

| | | |
|---|---|---|
| JP | 47-36288 B1 | 9/1972 |
| JP | 3031246 U | 9/1996 |
| JP | 8-301043 A | 11/1996 |
| JP | 11-189122 A | 7/1999 |
| WO | 99/08983 A1 | 2/1999 |

\* cited by examiner

RUPTURABLE PLATE FOR INFLATOR

BACKGROUND OF THE INVENTION

This application claims priority on provisional Application No. 60/360,011 filed on Feb. 28, 2002, and on Japanese Application No. 2001-381051 filed in Japan on Dec. 14, 2001, the entire contents of which are hereby incorporated by reference.

1. Field of the Invention

The present invention relates to a rupturable plate for an inflator mounted in various kinds of vehicles to protect a passenger mainly when a vehicle receives an impact from the lateral direction of the vehicle, an inflator, and an air bag apparatus.

2. Description of Related Art

As an inflator for an inflating type safety system of an automobile, in order to optimally protect a passenger in accordance with a position of a seat in a vehicle such as a driver side, a front passenger side next to the driver side, and the like, various kinds of inflators utilizing a pressurized gas such as an air bag inflator for a driver side, an air bag inflator for a passenger side, an air bag inflator for a side collision, an inflator for a knee-bolster air bag, an inflator for an inflatable seat belt, an inflator for a tubular system, and an inflator for pretensioner and the like are known.

In these inflators, outflow of a pressurized gas from the inflator is started by breaking a rupturable plate, and an air bag is inflated and developed. However, since the rupturable plate is broken only by activation of an igniter, without using a so-called enhancer agent (transfer charge), it becomes important to increase destructibility of the rupturable plate, that is, to make the rupturable plate broken easily in view of increasing reliability in operation of the inflator.

Further, when small pieces produced by the broken rupturable plate enters the air bag, the air bag may get dirty or damaged. Therefore, it is also important to prevent such a situation.

Incidentally, as related prior art, a device for inflating a flexible container using both helium and hydrogen is disclosed in U.S. Pat. No. 5,527,066. A gas flow device for an air bag using a pressurized inert gas is disclosed in U.S. Pat. No. 5,782,486. An air bag apparatus for inflating an air bag by nitrogen or helium is disclosed in U.S. Pat. No. 3,680,886. Aside-collision inflator housing for an air bag which uses both pressurized gas and a gas generating agent is disclosed in U.S. Pat. No. 5,803,493. A pressurized gas inflator which uses argon or nitrogen as a pressurized gas is disclosed in JP-U No. 3031246 publication.

As described above, in the conventional inflators, it is required to achieve both increasing in destructibility of a rupturable plate and preventing broken pieces thereof from flowing in an air bag. However, when destructibility of a rupturable plate is increased, broken pieces are too small to be arrested, therefore, it becomes difficult to arrest such small pieces, or a manufacturing cost is increased because of a complicated arresting means for arresting the broken pieces such as a filter or the like.

SUMMARY OF THE INVENTION

An object of the present invention is to solve both the problems regarding destructibility of a rupturable plate and preventing broken pieces from flowing into an air bag, thereby providing an inflator with high reliability.

The present invention provides, as one means for solving the above-described problem, in an inflator for inflating an article to be inflated with pressurized medium, a rupturable plate for blocking and closing between a portion charged with pressurized medium and maintained at high pressure and a portion not charged with pressurized medium and maintained at a normal pressure, wherein the rupturable plate is mounted to the inflator by fixing the peripheral edge portion thereof, and the whole plate, excluding the fixed peripheral edge portion, falls off as one piece when it has received the pressure. In this case, the pressure applied to the rupturable plate is not a pressure by the pressurized medium before actuation, but it is an impact or a pressure applied by actuation of an igniter or the like.

In the case of a circular rupturable plate, when the rupturable plate receives a pressure by an igniter or the like, a peripheral edge portion fixed to an inflator by a resistance-welding or the like remains as it is, and only the remaining circular rupturable plate (which is smaller than the original rupturable plate by the size corresponding to the peripheral edge portion) falls off. Thereby, no broken pieces of the rupturable plate are produced, so that an arresting means such as a filter is unnecessary or can be simplified.

Further, the present invention provides, as another means for solving the above-described problem, in an inflator inflating an article adapted to be inflated by pressurized medium, a rupturable plate for an inflator blocking and closing between a portion which is charged with pressurized medium and maintained at high pressure and a portion which is not charged with pressurized medium and maintained at normal pressure, wherein the rupturable plate is mounted to the inflator by fixing the peripheral edge portion thereof, and provided with at least one selected from the requirements (a) to (c):

(a) a ratio (diameter/thickness) of a thickness and a diameter of the rupturable plate is 14 to 50;

(b) a tensile strength is 880 to 1100 N/mm$^2$; and (c) an elongation is 25% or more.

By being provided with the above-described requirements (a) to (c), particularly preferably by being provided with the requirement (a) alone or a combination of the requirement (a) and the other requirements, when receiving a pressure by an igniter or the like, the circular rupturable plate is not broken as described above, and the circular rupturable plate falls off as a slightly smaller circular plate, so that arresting means such as a filter is unnecessary or can be simplified. Further, when the requirement (b) is provided in addition to the requirement (a), the falling remaining portion as the smaller circular rupturable plate is prevented from further being broken.

Further, the present invention provides, as another means for solving the above-described problem, in an inflator inflating an article adapted to be inflated by a pressurized medium, a rupturable plate for an inflator blocking and closing between a portion charged with pressurized medium and maintained at high pressure and a portion not charged with pressurized medium and maintained at normal pressure, wherein the rupturable plate is mounted to the inflator by fixing the peripheral edge portion thereof, provided with at least one selected from the requirements (a) to (c), and the whole plate, excluding the fixed peripheral edge portion, falls off as one piece when it has received the pressure.

(a) a ratio (diameter/thickness) of a thickness and a diameter of the rupturable plate is 14 to 50;

(b) a tensile strength is 880 to 1100 N/mm$^2$; and (c) an elongation is 25% or more.

In each of the above-described inventions, preferably, the inflator comprises an inflator housing charged with the pressurized medium and having an opening portion at its one end, and a diffuser portion fixed to the opening portion of the inflator housing and provided with a gas discharging hole for discharging outside the pressurized medium flowing from the opening portion wherein the rupturable plate closes an outflow passage for the pressurized medium between the opening portion of the inflator housing and the diffuser portion, and the rupturable plate is fixed to the inflator housing or the diffuser portion, and an igniter, which is a rupturing means for the rupturable plate, is preferably provided at the diffuser portion. Further, a gas discharging port, which is a discharging passage for the pressurized medium, can be connected to the gas discharging hole of the diffuser portion.

In each of the above-described inventions, it is preferable that the rupturable plate has a breaking pressure of 1.5 times or more than a charging pressure of the pressurized medium. In view of the life of a vehicle, preferably, in order to secure reliability of actuation over a long period, preferably, the rupturable plate for an inflator has a sufficient strength to such an extent that it can sustain the charging pressure of the pressurized medium.

In the above-described requirements (a) to (c), it is preferable, in order to exhibit the above-described operational effect easier, that the ratio (a) of the thickness and the diameter (diameter/thickness) of the requirement is 20 to 45, the tensile strength of the requirement (b) is 900 to 1060 N/mm$^2$, and the elongation of the requirement (c) is 30% or more.

In addition to the above-described requirements (a) to (c), or besides the requirements (a) to (c), in the rupturable plate for an inflator, the operational effect of the present invention can be exhibited by providing a fragile portion with the rupturable plate, for example, a continuous or discontinuous cut or groove, in a boundary portion between the fixed peripheral edge portion and a non-fixed portion.

Further, the present invention provides, as another means for solving the above-described problem, an inflator comprising an inflator housing charged with a pressurized medium and having an opening portion at its one end, and a diffuser portion fixed to the opening portion of the inflator housing and provided with a gas discharging hole for discharging outside the pressurized medium flowing from the opening portion in actuation, wherein a rupturable plate closes an outflow passage for the pressurized medium between the opening portion of the inflator housing and the diffuser portion, and an igniter, which is a rupturing means for the rupturable plate, is provided at the diffuser portion, wherein the rupturable plate is fixed to the inflator housing or the diffuser portion at a peripheral edge portion thereof, the whole plate, excluding the fixed peripheral edge portion, falls off as one piece when it has received the pressure.

Further, the present invention provides, as another means for solving the above-described problem, an inflator comprising an inflator housing charged with a pressurized medium and having an opening portion at its one end, and a diffuser portion fixed to the opening portion of the inflator housing and provided with a gas discharging hole for discharging outside the pressurized medium flowing from the opening portion, wherein a rupturable plate closes an outflow passage for the pressurized medium between the opening portion of the inflator housing and the diffuser portion, and an igniter, which is a rupturing means for the rupturable plate, is provided at the diffuser portion, wherein the rupturable plate is provided with at least one selected from the following requirements (a) to (c):

(a) a ratio (diameter/thickness) of a thickness and a diameter of the rupturable plate is 14 to 50;

(b) a tensile strength is 880 to 1100 N/mm$^2$; and (c) an elongation is 25% or more.

By being provided with the above-described requirements (a) to (c), particularly preferably by being provided with the requirement (a) alone or a combination of the requirement (a) and the other requirements, when receiving a pressure by an activation of an igniter or the like, the circular rupturable plate is not broken as described above, and the circular rupturable plate falls off as a slightly smaller circular plate excluding the peripheral edge portion, so that arresting means such as a filter becomes unnecessary or can be simplified. Accordingly, the number of parts and the number of manufacturing steps can be reduced, to reduce a manufacturing cost and additionally, a possibility such that broken pieces of the rupturable plate enter the air bag is eliminated, thereby improving reliability of a product.

Further, the present invention provides, as another means for solving the above-described problem, an inflator comprising an inflator housing charged with a pressurized medium and having an opening portion at its one end, and a diffuser portion fixed to the opening portion of the inflator housing and provided with a gas discharging hole for discharging outside the pressurized medium flowing from the opening portion in actuation, wherein a rupturable plate closes an outflow passage for the pressurized medium between the opening portion of the inflator housing and the diffuser portion, and an igniter, which is a rupturing means for the rupturable plate, is provided at the diffuser portion, wherein the rupturable plate and the igniter faces each other, and the rupturable plate is provided with at least one of the following requirements (a) to (c), and further provided with the following requirement (d) and/or (e):

(a) a ratio (diameter/thickness) of a thickness and a diameter of the rupturable plate is 14 to 50;

(b) a tensile strength is 880 to 1100 N/mm$^2$; and (c) an elongation is 25% or more;

(d) a distance between a tip end of the igniter and the central portion of the rupturable plate is 0.5 to 4 mm; and (e) an output of the igniter is not less than 750 psi (about 5300 kPa) when the igniter is put in a sealed container (having the inner volume of 10 ml) for which any changes due to heat and pressure do not substantially occur and actuated at the temperature of 20° C.

In addition to the above-described requirements (a) to (c), particularly preferably in addition to the requirement (a) alone or a combination of the requirement (a) and the other requirements, by further being provided with the requirement (d), or (e) or the requirements (d) and (e), the circular rupturable plate is not broken, and the circular rupturable plate falls off as a slightly smaller circular plate excluding the peripheral edge portion, so that a arresting means such as a filter becomes unnecessary or can be simplified.

In each of the above-described inflators, it is preferable that the rupturable plate for an inflator has a breaking pressure of 1.5 times or more than the charging pressure of the pressurized medium in order to secure reliability of actuation over a long period.

In the above-described inflators, it is preferable that the diameter of the gas discharging hole is smaller than a diameter of an outflow passage of the pressurized medium closed by the rupturable plate, namely, the diameter of the remaining portion of the rupturable plate which falls off. By setting the diameter in this manner, the remaining portion of the rupturable plate which falls off can be prevented from being discharging outside the inflator.

In each of the above-described inflators, a gas discharging port, which is a discharging passage for the pressurized medium, is connected to the gas discharging hole of the diffuser portion.

In this case, instead of adjusting the diameter of the above-described gas discharging hole, the diameter of the discharging passage for the pressurized medium in the gas discharging port or the diameter of the opening portion of the gas discharging port can be made smaller than the diameter of the remaining portion of the rupturable plate which falls off.

With respect to the above-described requirements (a) to (e), in order to easily exhibit the above-described operational effect, preferably, a ratio of the thickness and the diameter (diameter/thickness) in the requirement (a) is 20 to 45, a tensile strength in the requirement (b) is 900 to 1060 N/mm$^2$, and the elongation in the requirement (c) is 30% or more, and further, a distance between the tip of the igniter and the central portion of the rupturable plate in the requirement (d) is 0.8 to 3 mm and the output of the igniter in the requirement (e) is 1000 psi (about 7100 kPa) or more.

In the above-described inflators, desirably, the igniter has zirconium/potassium perchlorate as a priming in an amount of preferably 190 mg or more and more preferably 260 mg or more in order to easily exhibit the above-described operational effect.

Further, the present invention provides, as another means for solving the above-described problem, an air bag apparatus provided with an activation signal-outputting means comprising an impact sensor and a control unit, and a module case accommodating the above-described inflator and an air bag.

In the inflator of the present invention, since the rupturable plate is not broken into small pieces and it falls off in a size smaller than its original size, excluding the size of the fixed peripheral edge portion, a arresting means such as a filter is unnecessary. For this reason, a manufacturing process can be facilitated and the number of parts can be reduced, and thereby, a manufacturing cost can be reduced.

DETAILED DESCRIPTION OF THE INVENTION

Figure 1:
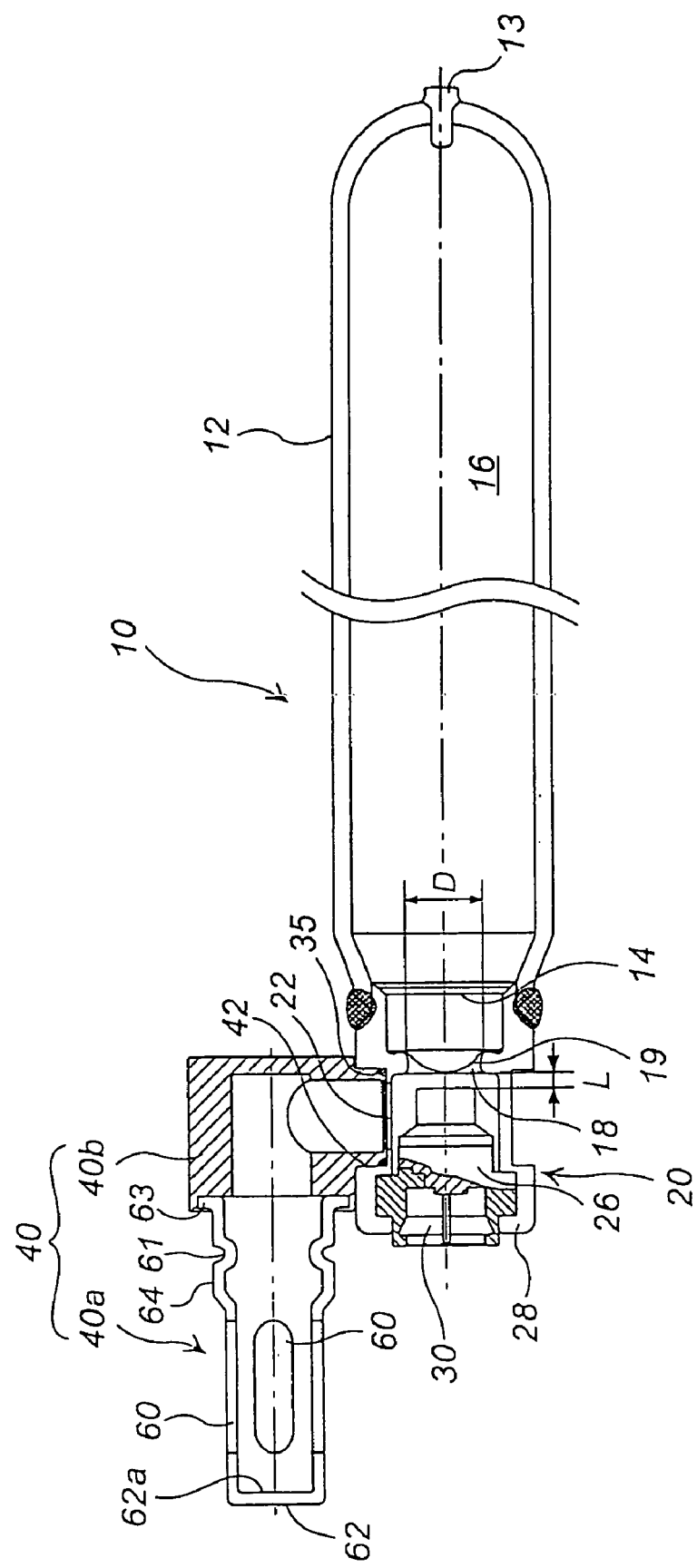
FIG. 1 is a sectional view of an inflator in the longitudinal direction.
Figure 2:
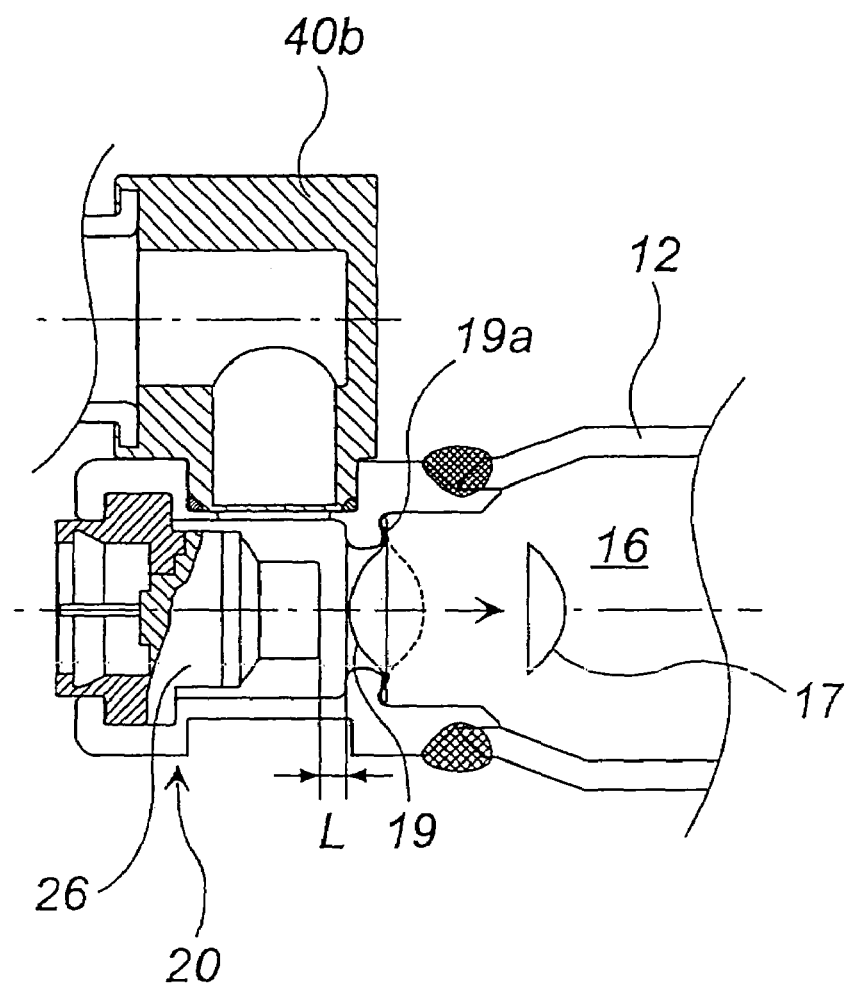
FIG. 2 is a partially enlarged view of the inflator shown in FIG. 1.

One embodiment of the present invention will be explained below with reference to the drawings. FIG. 1 is a sectional view of an inflator 10 in the longitudinal direction, and FIG. 2 is a view for explaining a broken state of a rupturable plate when the inflator 10 of the present invention is actuated, and it is a partially enlarged view of FIG. 1.

One end of an inflator housing 12 has an opening portion 14, and a closed end portion. An inner space 16 is charged with a pressurized medium comprising an inert gas such as argon or helium or nitrogen gas at the maximum pressure of about 70,000 kPa. A cross section of the inflator housing 12 in the widthwise direction is circular in shape, and the opening portion 14 is also circular in shape.

The inflator housing 12 can be manufactured by swaging or spinning a pipe, or an existing gas cylinder can be directly utilized.

In case of swaging or spinning a pipe, one end thereof is almost closed, maintaining a small hole used as a charging hole for charging a pressurized medium. After a diffuser portion 20 is connected to the inflator housing 12, the pressurized medium is charged through a gap between a sealing pin 13 inserted into the small hole. Thereafter, the inflator housing 12 is welded at the portion of the sealing pin 13 to be completely closed.

The diffuser portion 20 is connected to the opening portion 14 of the inflator housing 12, and the diffuser portion 20 has a first gas discharge hole 22 for discharging the pressurized medium outside. Since the first gas discharging hole 22 is not closed, the interior of the diffuser portion 20 is maintained at normal pressure.

The inflator housing 12 and the diffuser portion 20 may be connected by welding as shown in FIG. 1, or a male screw portion provided on an end portion of an outer peripheral surface of the inflator housing 12 may screw in a female screw portion provided on an end portion of an inner peripheral surface of the diffuser portion 20 to connect the housing and the diffuser portion.

An outflow passage 18 for a pressurized medium provided between the opening portion 14 of the inflator housing 12 and the diffuser portion 20 is closed by a bowl-like shaped rupturable plate 19, and the inner space 16 of the inflator housing 12 is maintained at a high-pressure airtight state before actuation. The diameter (D) of the opening portion 14 (=the diameter of the outflow passage 18) is set to be larger than the diameter of the first gas discharging hole 22.

The rupturable plate 19 is like a disk before it is mounted to the inflator 10, and it is fixed to the diffuser portion 20 at a peripheral portion 19a by a resistance welding. The rupturable plate 19 is transformed into a bowl-like shape as illustrated by a pressing force due to the pressurized medium charged in the inner space 16. Incidentally, the rupturable plate 19 may be mounted to the opening portion 14 of the inflator 12.

In order to keep reliable operability of the rupturable plate 19 for a long term, it is preferable that the rupturable plate 19 has a breaking pressure of 1.5 times or more than the charging pressure of the pressurized medium, and that it is further provided with at least one of the requirements selected from the following requirements (a) to (c):

(a) A ratio (diameter/thickness) of the thickness and the diameter is preferably 14 to 50, more preferably 20 to 45, and further preferably 30 to 45. Incidentally, the thickness and the diameter are not based upon the illustrated bowl-like shaped rupturable plate 19 but based upon the rupturable plate in a flat disk-like shape before installation thereof. The diameter is a diameter (a diameter D of an outflow passage 18 for the pressurized medium) of a remaining portion 17 of a broken rupturable plate which is fallen off and it does not include the fixed peripheral edge portion 19a.

(b) A tensile strength is preferably 880 to 1100 N/mm$^2$, more preferably 900 to 1060 N/mm$^2$, and further preferably 950 to 1060 N/mm$^2$.

(c) An elongation is preferably not less than 25%, more preferably not less than 28%, and further preferably not less than 30%.

The requirements (a) to (c) can be provided in such combinations as (a) and (b), (a) and (c), (b) and (c), or (a), (b), and (c), but it is particularly preferable that the requirement (a) is provided. In order to exhibit the operational effect of the present invention, the case of providing only the requirement (a) or the case of providing a combination of the requirement (a) and the other requirements is desirable.

By providing the requirements (a) to (c), when an igniter 26 is activated, the rupturable plate 19 receives a pressing force due to the ignition, and the whole plate 19, except for the fixed peripheral edge portion 19a (which is the rupturable plate remaining portion 17 shown in FIG. 2, having a diameter coinciding with the diameter D of the opening portion), can be easily fallen off as one piece, so that small broken pieces may be hardly generated. Further, it is preferable to provide the requirement (b) in addition to the requirement (a), because the rupturable plate remaining portion 17 is prevented from being further broken into smaller pieces by collision thereof in the inflator 10.

In order to exhibit the operational effect of the present invention, the rupturable plate 19 can have a fragile portion such as a continuous cut or a discontinuous cut (sewing-machine perforations) or a groove in a boundary between the fixed peripheral edge portion 19a and a non-fixed portion, in addition to the above-described requirements (a) to (c) or separately from the requirements (a) to (c).

The igniter 26 provided with a priming is provided, as breaking means for the rupturable plate 19, at a position facing the rupturable plate 19 in the diffuser portion 20. A predetermined distance L is secured between the central portion (a projecting portion towards the igniter 26) of the rupturable plate 19 and a tip of the igniter 26. The igniter 26 is mounted after the inflator housing 12 and the diffuser portion 20 are connected to each other. The igniter 26 is fitted in the direction from the opening portion at one end of the diffuser portion 20 towards the rupturable plate 19, and it is fixed by crimping a peripheral edge 28 of the opening portion at the one end of the diffuser portion 20 after being fitted. Reference numeral 30 denotes a connector.

It is preferable that the igniter 26 is provided with the following requirement (d), requirement (e), or the requirements (d) and (e) which relate to a coordination with the rupturable plate 19 and an output of the igniter.

(d) A distance (L) between the tip end of the igniter and the central portion of the rupturable plate is preferably 0.5 to 4 mm, more preferably 0.8 to 3 mm, and further preferably 1 to 3 mm.

(e) The output of the igniter is preferably not less than 750 psi (about 5300 kPa), and more preferably not less than 1000 psi (about 7100 kPa) or more when the igniter is placed inside a sealed container (having an inner volume 10 ml) for which any changes due to heat or pressure changes do not occur substantially and the igniter is actuated at the temperature of 20° C.

Regarding the requirements (d) and/or (e), one or both thereof can be combined with the respective combinations of the above-described requirements (a) to (c).

By providing the requirements (d) and/or (e), when the igniter 26 is ignited, a proper pressing force due to the igniting can be applied to the rupturable plate 19. Therefore, the falling-off performance given by the provided requirements (a) to (c) is promoted.

In order to promote exhibition of the operational effects due to the requirements (d) and (e), it is preferable that the igniter 26 has zirconium/potassium perchlorate (ZPP) in an amount of preferably not less than 190 mg and more preferably not less than 260 mg as a priming.

The diffuser portion 20 is connected with a gas discharging port 40, and these members are connected to each other by press-fitting an inflow portion 42 for a pressurized medium of a gas discharging port 40 into the first gas discharging hole 22 of the diffuser portion 20. At this time, the diameter of an inflow portion 42 of the gas discharging port 40 is set to be slightly smaller than the diameter of the first gas discharging hole 22 of the diffuser portion 20. A connection strength of a connection portion between the diffuser portion 20 and the gas discharging port 40 can be increased by winding a metallic band and the like on the connection portion from the outside to fasten the same thereon.

The gas discharging port 40 is mounted such that the center axis (shown in the dashed line in FIG. 1) of the inflator housing 12 and the center axis (shown in the dashed line in the longitudinal direction in FIG. 1) of the gas discharging port 40 are parallel to each other.

The gas discharging port 40 comprises a main body portion 40a having one end closed (a closed end surface 62), and the other end opened as well as a flange portion 63, and an adapter portion 40b. They are connected to each other by engaging the flange portion 63 of the main body portion 40a with the inside of the adapter portion 40b, or by crimping an end portion of the adapter 40b after fitted, or alternatively, they may be connected by resistance-welding. Incidentally, in the gas discharging port 40, the main body portion 40a and the adapter portion 40b can be integrally formed.

The adapter portion 40b and the diffuser portion 20 are connected to each other at a welding portion 35 by resistance-welding. At this time, after the adapter portion 40b (the inflow portion 42) and the diffuser portion 20 are resistance-welded to each other, the main body portion 40a may be connected, or after the main body portion 40a and the adapter portion 40b are connected to each other, the adapter portion 40b and the diffuser portion 20 may be resistance-welded to each other.

A plurality of opening portions (second gas discharging holes) 60 are provided on a side surface of the main body portion 40a, and, in the plurality of opening holes 60, at least two holes are arranged symmetrically to each other regarding the widthwise direction or arranged approximately thereto. With respect to the opening portions 60, for example, six holes can be provided at equal intervals in the circumferential direction. The diameter of the opening portion 60 can be made smaller than the diameter of the rupturable plate remaining portion 17.

A protrusion portion 64 and a groove portion (recessed portion) 61 provided continuously or with an interval (preferably, continuously) in the circumferential direction are provided near the adapter 40b of the main body portion 40a.

A top surface of the protrusion portion 64 is flat, a screw portion (a male screw thread or a female screw thread) can be provided on the flat surface as required, and the protrusion portion 64 is provided near the opening portions 60. The protrusion portion 64 is useful when the inflator 10 is connected to an air bag at the gas discharging port 40. The height of the protrusion portion 64 in the radial direction and a length thereof in the axial direction can be determined in view of connectability (connection strength, processing or the like) to the air bag.

In assembling an air bag apparatus, after an air bag is put on to cover the main body portion 40a, the air bag is fastened at the groove portion 61, so that the groove portion 61 serves to both elements firmly to prevent the air bag from falling off. The radial depth of the groove portion 61 can be determined in view of connectability (connection strength, processing or the like) to the air bag.

Next, an operation when the inflator 10 of the present invention is applied to a curtain air bag will be explained with reference to FIG. 1 and FIG. 2.

When mounted to a vehicle, the inflator 10 is mounted as a system combining activation signal-outputting means including an impact sensor and a control unit with a module case accommodating the above-described inflator 10 and a curtain air bag, and so on. The curtain air bag is connected to cover the second gas discharging holes 60 of the gas discharging port 40.

First, when the vehicle receives an impact, the igniter 26 is activated upon receiving a signal from the impact sensor, and the priming is ignited and burnt. The rupturable plate 19 has a bowl-like shape projecting towards the igniter 26 before activation of the igniter 26 (the state indicated with a solid line in FIG. 1 and FIG. 2). However, it is estimated that, just after activation, the rupturable plate 19 receives a pressing force from the igniter 26 to change its shape to a bowl-like shape projecting towards the opposite side, as shown with the broken line in FIG. 2. Thereafter, the rupturable plate 17 excluding the peripheral edge portion 19a, which is fixed to the diffuser portion 20 by resistance-welding (the diameter of the rupturable plate remaining portion 17 approximately coincide with the diameter D of the opening portion 14), falls off as shown in FIG. 2.

Since the opening portion 14 is opened by breaking the rupturable plate 19, the pressurized medium in the inner space 16 passes through the outflow passage 18 to be discharged out from the first gas discharging hole 22, and flows into the gas discharging port 40 via the inflow portion 42, and further flows out from the second gas discharging holes 60 to inflate the curtain air bag.

At this time, the diameter (D) (the diameter D of the opening portion 14) of the fallen rupturable plate remaining portion 17 is larger than the diameter of the first gas discharging hole 22, and therefore, the rupturable plate remaining portion 17 is never discharged outside the inflator 10, so that a filter for capturing broken pieces generated due to breaking the rupturable plate is not required or can be simplified. Even if the rupturable plate remaining portion 17 passes through the first gas discharging hole 22, the rupturable plate remaining portion 17 is caught to stay in a pocket-like bottom portion 62a of the gas discharging port 40 by making the diameter of the opening 60 smaller than the diameter of the rupturable plate remaining portion 17. Accordingly, the rupturable plate remaining portion is never discharged from the inflator 10.

Incidentally, in case of applying the inflator of the present invention to an inflator for a side collision, the gas discharging port 40 is unnecessary and an air bag is connected to a portion of the first gas discharging hole 22 directly or via a suitable adapter.

EXAMPLES

Examples 1 to 3

The inflators shown in FIG. 1 and FIG. 2 were manufactured. Incidentally, as the rupturable plate, one provided with the following requirements and the like was used. As the rupturable plate, one comprising nickel-chrome alloy (containing 61 mass % of nickel and 21.5 mass % of chrome) was used.

Requirement (a): diameter/thickness=9 (mm)/0.275 (mm) =32.7
Requirement (b): tensile strength=about 1000N/mm$^2$
Requirement (c): elongation=30% or more
Requirement (d): distance L between a tip end of an igniter and the central portion of a rupturable plate=0.5 mm, 1.0 mm or 1.5 mm
Requirement (e): output of an igniter=1000 psi (about 7100 kPa)
Priming: ZPP 260 mg
Kind of a pressurized medium and a charging pressure: helium, 59 MPa After these inflators were activated, the diffuser portions were removed and the states of the rupturable plates were examined. The rupturable plate remaining portions excluding the peripheral edge portions of the original rupturable plates were confirmed. All the diameters of the rupturable plates were 9 mm and approximately coincide with the diameters (D) of the opening portion.

Examples 4 to 5

The inflators were obtained by setting the same requirements as those in Example 1 except that, in the requirement (a), it was set to be 40 and 43.6. After these inflators were activated, the diffuser portions were removed and the states of the rupturable plates were examined. The rupturable plates remaining portions excluding the peripheral edge portions of the original rupturable plates were confirmed. The diameters of the rupturable plate remaining portions were 11 mm and 12 mm, and they approximately coincide with the diameters (D) of the opening portion.

The invention claimed is:

1. An inflator for inflating an article adapted to be inflated by a pressurized medium, comprising:
   a rupturable plate which blocks and closes an outflow passage between a portion charged with the pressurized medium and a portion not charged with the pressurized medium, the rupturable plate being mounted to the outflow passage by fixing a peripheral edge portion of the rupturable plate to the outflow passage, such that the rupturable plate bulges toward the portion not charged with the pressurized medium; and
   an igniter for rupturing the rupturable plate provided in the portion not charged with the pressurized medium,
   wherein, a remaining portion of the rupturable plate excluding the peripheral edge portion falls off without breaking by bulging towards the portion charged with the pressurized medium when the rupturable plate receives a pressure generated by the igniter.

2. An inflator for inflating an article adapted to be inflated with a pressurized medium, comprising:
   a rupturable plate which blocks and closes an outflow passage between a portion charged with the pressurized medium and a portion not charged with the pressurized medium, the rupturable plate being mounted to the outflow passage by fixing a peripheral edge portion of the rupturable plate, such that the rupturable plate bulges toward the portion not charged with the pressurized medium; and
   an igniter for rupturing the rupturable plate provided in the portion not charged with the pressurized medium,
   wherein a remaining portion of the rupturable plate excluding the peripheral edge portion falls off without breaking by bulging towards the portion charged with the pressurized medium when the rupturable plate receives a pressure from the igniter, and the rupturable plate being provided with at least one of the following requirements (a) to (c):
   (a) a ratio of a diameter and a thickness of the rupturable plate is 14 to 50;
   (b) a tensile strength is 880 to 1100 N/mm$^2$; and
   (c) an elongation is 25% or more.

3. An inflator for inflating an article adapted to be inflated with a pressurized medium, comprising:
   a rupturable plate which blocks and closes an outflow passage between a portion charged with the pressurized medium and a portion not charged with the pressurized medium, the rupturable plate being mounted to the outflow passage by fixing a peripheral edge portion of the rupturable plate, such that the rupturable plate bulges toward the portion not charged with the pressurized medium, and the rupturable plate being provided with at least one of the following requirements (a) to (c); and an igniter for rupturing the rupturable plate provided in the portion not charged with the pressurized medium, wherein, a remaining portion of the rupturable plate excluding the peripheral edge portion falls off without breaking by bulging towards the portion charged with the pressurized medium when the rupturable plate receives a pressure from the igniter:

(a) a ratio of a diameter and a thickness of the rupturable plate is 14 to 50;

(b) a tensile strength is 880 to 1100 N/mm$^2$; and (c) an elongation is 25% or more.

4. An inflator according to any one of claims 1 to 3, further comprising:

an inflator housing charged with the pressurized medium and having an opening portion at one end; and a diffuser portion attached to the opening portion of the inflator housing and having a gas discharging hole for discharging the pressurized medium flowing from the opening portion, wherein the igniter is provided in the diffuser portion, and wherein the rupturable plate is attached to one of the inflator housing and the diffuser portion.

5. An inflator according to claim 4, further comprising:

a gas discharging port connected to the gas discharging hole of the diffuser portion.

6. An inflator according to any one of claims 1 to 3, wherein the rupturable plate has a rupturing pressure of 1.5 times or more than the charging pressure of the pressurized medium.

7. An inflator according to claim 2 or 3, wherein the ratio of the diameter and the thickness in the requirement (a) is 20 to 45.

8. An inflator according to claim 2 or 3, wherein the tensile strength in the requirement (b) is 900 to 1060 N/mm$^2$.

9. An inflator according to claim 2 or 3, wherein the elongation in the requirement (c) is 30% or more.

10. An inflator according to any one of claims 1 to 3, wherein the rupturable plate has a fragile portion in the boundary between the peripheral edge portion and a remaining portion.

11. Inflator according to claim 10, wherein the fragile portion is a continuous or discontinuous cut or groove.

12. An inflator, comprising:

an inflator housing charged with a pressurized medium and having an opening portion at one end;

a diffuser portion attached to the opening portion and having a gas discharging hole for discharging the pressurized medium flowing from the opening portion;

an outflow passage that allows the pressurized medium to flow from the inflator housing to the diffuser portion;

a rupturable plate attached to the outflow passage at a peripheral edge portion, such that the rupturable plate bulges toward the portion not charged with the pressurized medium; and an igniter, provided in the diffuser portion, for rupturing the rupturable plate, wherein a remaining portion of the rupturable plate excluding the peripheral edge portion falls off without breaking by bulging towards the portion charged with the pressurized medium when the rupturable plate receives a pressure from the igniter.

13. An inflator according to claim 12, wherein the rupturable plate has a rupturing pressure of 1.5 times or more than the charging pressure of the pressurized medium.

14. An inflator according to claim 12, wherein a diameter of the gas discharging hole is smaller than a diameter of the outflow passage closed by the rupturable plate.

15. An inflator according to claim 12, further comprising:

a gas discharging port connected to the gas discharging hole and having an opening portion.

16. An inflator according to claim 12, wherein the igniter has zirconium/potassium perchlorate as a priming in an amount of 190 mg or more.

17. An inflator according to claim 12, wherein the igniter has zirconium/potassium perchlorate as a priming in an amount of 260 mg or more.

18. An air bag apparatus comprising:

activation signal-outputting means including an impact sensor and a control unit; and a module case accommodating and air bag and an inflator according to claim 12.

19. An inflator, comprising:

an inflator housing charged with a pressurized medium and having an opening portion at one end;

a diffuser portion attached to the opening portion of the inflator housing and having a gas discharging hole for discharging the pressurized medium flowing from the opening portion;

an outflow passage that allows the pressurized medium to flow from the inflator housing to the diffuser portion;

a rupturable plate attached to the outflow passage at a peripheral portion, such that the rupturable plate bulges toward the portion not charged with the pressurized medium; and an igniter for rupturing the rupturable plate and provided in the diffuser portion, wherein, a remaining portion of the rupturable plate excluding the peripheral edge portion falls off without breaking by bulging towards the portion charged with the pressurized medium when the rupturable plate receives a pressure from the igniter, and wherein the rupturable plate is provided at least one of the following requirements (a) to (c):

(a) a ratio of a diameter and a thickness of the rupturable plate is 14 to 50;

(b) a tensile strength is 880 to 1100 N/mm2; and (c) an elongation is 25% or more.

20. An inflator according to claim 19, wherein a ratio of the diameter and the thickness in the requirement (a) is 20 to 45.

21. An inflator according to claim 19, wherein the tensile strength in the requirement (b) is 900 to 1060 N/mm$^2$.

22. An inflator according to claim 19, wherein the elongation in the requirement (c) is 30% or more.

23. An inflator, comprising:

an inflator housing charged with a pressurized medium and having an opening portion at one end;

a diffuser portion attached to the opening portion of the inflator housing and having a gas discharging hole for discharging the pressurized medium flowing from the opening portion;

an outflow passage that allows the pressurized medium to flow from the inflator housing to the diffuser portion;

a rupturable plate attached to the outflow passage at a peripheral portion, such that the rupturable plate bulges toward the portion not charged with the pressurized medium; and an igniter for rupturing the rupturable plate and provided in the diffuser portion, wherein, a remaining portion of the rupturable plate excluding the peripheral edge portion falls off without breaking by bulging towards the portion charged with the pressurized medium when the rupturable plate receives a pressure directly from the igniter, and wherein the rupturable plate and the igniter face each other, the rupturable plate is provided with at least one of the following the requirements (a) to (c), and further provided with at least one of the following requirements (d) and (e):

(a) a ratio of a diameter and a thickness of the rupturable plate is 14 to 50;

(b) a tensile strength is 880 to 1100 N/mm$^2$; and (c) an elongation is 25% or more;

(d) a distance between a tip of the igniter and the central portion of the rupturable plate is 0.5 to 4 mm; and (e) an output of the igniter is not less than 750 psi when the igniter is put in a sealed container having the inner volume of 10 ml in which heat and pressure do not change substantially and actuated at the temperature of 20° C.

24. An inflator according to claim 23, wherein the distance between the tip of the igniter and the central portion of the rupturable plate in the requirement (d) is 0.8 to 3 mm.

25. An inflator according to claim 23, wherein the output of the igniter in the requirement (e) is 1000 psi or more.

26. An inflator for inflating an article adapted to be inflated by a pressurized medium, comprising:

a rupturable plate which blocks and closes an outflow passage between a portion charged with the pressurized medium and a portion not charged with the pressurized medium, the rupturable plate being mounted to the outflow passage by fixing a peripheral edge portion of the rupturable plate to the outflow passage, such that a remaining portion of the rupturable plate excluding the peripheral edge portion falls off without breaking when the rupturable plate receives a pressure, wherein the rupturable plate has a fragile portion in the boundary between the peripheral edge portion and a remaining portion, and the fragile portion is a continuous or discontinuous cut or groove.

27. An inflator for inflating an article adapted to be inflated by a pressurized medium, comprising:

a rupturable plate which blocks and closes an outflow passage between a portion charged with the pressurized medium and a portion not charged with the pressurized medium, the rupturable plate being mounted to the outflow passage by fixing a peripheral edge portion of the rupturable plate to the outflow passage, such that a remaining portion of the rupturable excluding the peripheral edge portion falls off without breaking when the rupturable plate receives a pressure, a diameter of the remaining portion being substantially the same as a diameter of the outflow passage, wherein the rupturable plate has a fragile portion in the boundary between the peripheral edge portion and a remaining portion, and wherein the fragile portion is a continuous or discontinuous cut or groove.

* * * * *